United States Patent
Kang et al.

(10) Patent No.: US 8,605,403 B2
(45) Date of Patent: Dec. 10, 2013

(54) THERMAL PROTECTION CIRCUIT AND ELECTRONIC DEVICE USING THE SAME

(75) Inventors: Hong-Hao Kang, Shanghai (CN); Zhi-Wei Wang, Shanghai (CN); Chi-Hung Lin, Taipei Hsien (TW)

(73) Assignees: Ambit Microsystems (Shanghai) Ltd., Shanghai (CN); Hon Hai Precision Industry Co., Ltd., New Taipei (TW)

( * ) Notice: Subject to any disclaimer, the term of this patent is extended or adjusted under 35 U.S.C. 154(b) by 871 days.

(21) Appl. No.: 12/770,735

(22) Filed: Apr. 30, 2010

(65) Prior Publication Data

US 2011/0194223 A1    Aug. 11, 2011

(30) Foreign Application Priority Data

Feb. 5, 2010    (CN) .......................... 2010 2 0302435

(51) Int. Cl.
  *H02H 5/04*    (2006.01)
(52) U.S. Cl.
  USPC .......................................................... 361/106
(58) Field of Classification Search
  USPC .......................................................... 361/106
  See application file for complete search history.

(56) References Cited

U.S. PATENT DOCUMENTS

| 4,227,230 | A | * | 10/1980 | Bray ............................. 361/152 |
| 4,467,386 | A | * | 8/1984 | Wasson ........................ 361/106 |
| 4,540,295 | A | * | 9/1985 | Okunishi et al. ......... 400/124.03 |
| 5,986,241 | A | * | 11/1999 | Funahashi ..................... 219/497 |
| 2006/0238232 | A1 | * | 10/2006 | Bourgoin et al. ............. 327/333 |
| 2009/0034307 | A1 | * | 2/2009 | Faccin .......................... 363/131 |

* cited by examiner

*Primary Examiner* — Rexford Barnie
*Assistant Examiner* — Ann Hoang
(74) *Attorney, Agent, or Firm* — Altis Law Group, Inc.

(57) ABSTRACT

A thermal protection circuit to protect an electronic device from over-heat comprises a temperature sensor, a hysteresis comparator and a switch circuit. The temperature sensor senses internal temperature of the electronic device and output an internal temperature signal with voltage. The hysteresis comparator outputs a power-off signal when the voltage of the internal temperature signal is lower than a low voltage threshold representing an a determined temperature, or outputs a power-on signal when the voltage of the internal temperature signal is higher than a high voltage threshold representing a restarting temperature. The switch circuit stops transmitting power signals to the electronic device in response to the power-off signal, or continues to transmit the power signals to the electronic device in response to the power-on signal.

14 Claims, 3 Drawing Sheets

THERMAL PROTECTION CIRCUIT AND ELECTRONIC DEVICE USING THE SAME

BACKGROUND

1. Technical Field

Embodiments of the present disclosure relate to electronic devices, and particularly to an electronic device with a thermal protection circuit.

2. Description of Related Art

Nowadays, a plurality of integrated circuits and chips are employed in a single electronic device to meet multifunction requirements. In order to follow tendencies of miniaturization and portability, the integrated circuits and chips are placed on a small-sized circuit board. When the electronic device operates for an exceedingly long time or gets short circuited, the integrated circuits and chips generate great heat. Much of the generated heat cannot be dissipated in a timely manner and further heats the electronic device to a high temperature, which would cause irreversible damage.

BRIEF DESCRIPTION OF THE DRAWINGS

Other advantages and novel features of the present invention will become more apparent from the following detailed description of preferred embodiment when taken in conjunction with the accompanying drawings, in which.

DETAILED DESCRIPTION

Figure 1:
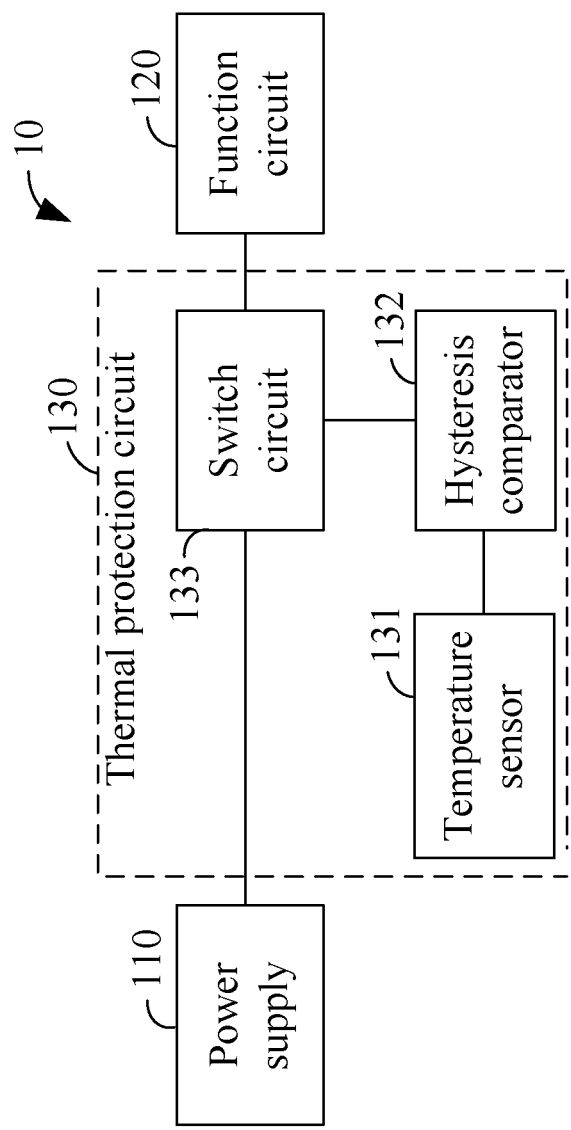
FIG. 1 is a block diagram of one embodiment of an electronic device in accordance with the present disclosure.

Referring to FIG. 1, a block diagram of the electronic device 10 according to one embodiment of the present disclosure is shown. In the embodiment, the electronic device 10 comprises a power supply 110, a function circuit 120 and a thermal protection circuit 130 disposed between the power supply 110 and the function circuit 120. The power supply 110 provides power signals to drive the function circuit 120. The function circuit 120 may be configured with one or more circuit modules or chips, such as a display module, a storage module, and a processor of the electronic device 10, to implement particular functions. The thermal protection circuit 130 comprises a temperature sensor 131, a hysteresis comparator 132, and a switch circuit 133.

The thermal protection circuit 130 stops providing the power signals to the function circuit 120 when an internal temperature of the electronic device 10 exceeds a determined temperature, such as an over-heating temperature of the electronic device 10. Once the electronic device 10 cools down to a restarting temperature, the thermal protection circuit 130 continues to provide the power signals to the function circuit 120. For example, the over-heat temperature may be set to about 80° C. as the highest temperature is about 90° C., the restarting temperature may be set to about 40° C. as the practical environment temperature surrounding the electronic device 10 is about 30° C. In the embodiment, the highest temperature is a designed temperature according to thermal performance of the electronic device 10, below which the electronic device 10 can operate safely. It is preferable that the over-heating temperature or the determined temperature is set 10-20 below the highest temperature of the electronic device 10. The restarting temperature is configured to represent that the electronic device 10 cools down enough to recover from overheating, and is determined according to a practical temperature of an environment where the electronic device 10 is placed. It is preferable that the restarting temperature is set 10-20 above the environment temperature.

Figure 2:
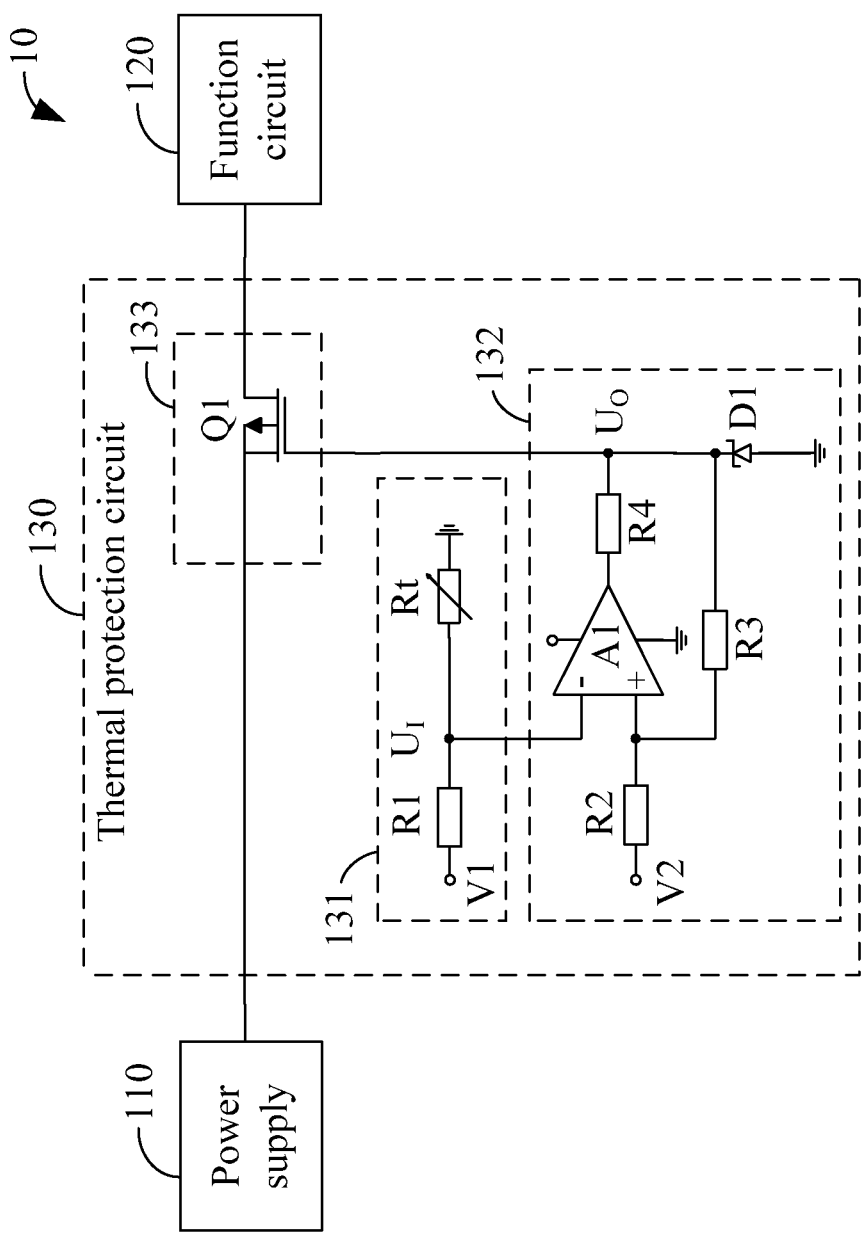
FIG. 2 is a detailed circuit diagram of one embodiment of a thermal protection circuit in accordance with the present disclosure.

Referring to FIG. 2, a detailed circuit diagram of the thermal protection circuit 130 according to one embodiment of the present disclosure is shown. In the embodiment, the temperature sensor 131 senses the internal temperature of the electronic device 10, and outputs an internal temperature signal with a voltage $U_I$ inversely proportional to the internal temperature.

As shown in FIG. 2, the temperature sensor 131 comprises a first voltage division circuit. The first voltage division circuit is connected between a first reference voltage V1 and the ground, which comprises a first resistor R1 and a thermistor Rt connected in series between the first reference voltage V1 and the ground. A common node of the first resistor R1 and the thermistor Rt is defined as an output of the temperature sensor 131 to output the internal temperature signal.

In the embodiment, the thermistor Rt has a negative temperature coefficient (NTC), and has a resistance inversely proportional to the internal temperature of the electronic device 10. The first resistor R1 and the thermistor Rt are connected in turn between the first reference voltage V1 and the ground. Therefore, the temperature sensor 131 outputs the internal temperature signal with the voltage $U_I$ decreasing proportionally with the internal temperature of the electronic device 10 increasing.

In other alternative embodiments, the thermistor Rt has a positive temperature coefficient (PTC), and has a resistance directly proportional to the internal temperature of the electronic device 10 increasing. The thermistor Rt and the first resistor R1 are connected in turn between the first voltage reference V1 and the ground. Therefore, the temperature sensor 131 outputs the internal temperature signal with the voltage $U_I$ decreasing proportionally with the internal temperature of the electronic device 10 increasing.

The hysteresis comparator 132 compares the voltage $U_I$ of the internal temperature signal with a high voltage threshold and a low voltage threshold. The high voltage threshold represents the restarting temperature of the electronic device 10. The low voltage threshold represents the determined temperature of the electronic device 10.

In the embodiment, the hysteresis comparator 132 comprises a zener diode D1, a second voltage division circuit, and an operational amplifier A1. An anode of the zener diode D1 is grounded. In the embodiment, the zener diode D1 has a zener voltage $U_Z$ higher than the power signals provided by the power supply 110. The second voltage division circuit is connected between a second voltage reference V2 and the ground, and comprises a second resistor R2 and a third resistor R3 connected in series. The operational amplifier A1 comprises an inverting input connected to the output of the temperature sensor 131. A non-inverting input connected to a node of the second resistor R2 and the third resistor R3 of the second voltage division circuit, and an output connected to a cathode of the zener diode D1 and outputting a power-on signal or a power-off signal.

In alternative embodiment, the hysteresis comparator 132 further comprises a fourth resistor R4 to limit current flowing through the output of the operational amplifier A1. The fourth resistor R4 has one end connected to the output of the operational amplifier A1, and another end connected to the cathode of the zener diode D1 to output the power-on signal and the power-off signal.

Figure 3:
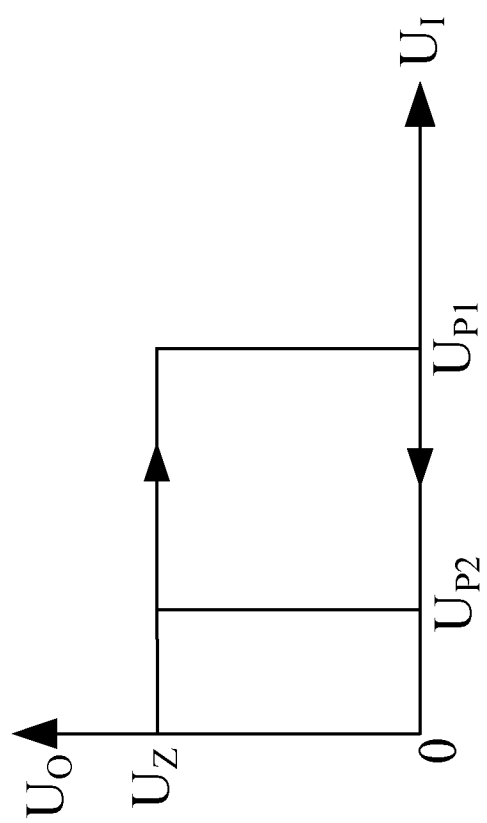
FIG. 3 illustrates characters of a hysteresis comparator of the thermal protection circuit in accordance with the present disclosure.

Referring to FIG. 3, a diagram of characters of the hysteresis comparator 132 is shown. As shown in FIG. 3, the hysteresis comparator 132 has an upper triggering voltage $U_{P1}$ and a lower triggering voltage $U_{P2}$, which can be calculated by formulas as shown below:

$$U_{P1}=U_2 \times R2/(R2+R3)+U_Z \times R3/(R2+R3)$$

$$U_{P2}=U_2 \times R2/(R2+R3)$$

In these formulas, U2 represents the voltage of the reference voltage V2. R2 and R3 represent resistances of the second resistor R2 and the third resistor R3, respectively.

In the embodiment, the upper triggering voltage $U_{P1}$ and the lower triggering voltage $U_{P2}$ are corresponding to the high voltage threshold and the low voltage threshold respectively, difference between which is defined as a hysteresis voltage of the hysteresis comparator 132. Accordingly, the hysteresis voltage determines a hysteresis temperature of the thermal protection circuit 130, which is equal to difference between the determined temperature and the restarting temperature of the electronic device 10.

In alternative embodiment, the upper triggering voltage $U_{P1}$ and the lower triggering voltage $U_{P2}$ can be adjusted by adjusting the resistances of the second resistor R3 and the third resistor R4 of the second voltage division circuit. Accordingly, the restarting temperature and the determined temperature of the electronic device 10 are adjusted. Additionally, the upper triggering voltage $U_{P1}$ can be further adjusted by adjusting the zener voltage $U_Z$ of the zener diode D1. Therefore, the hysteresis voltage and the hysteresis temperature of the hysteresis comparator 131 are all adjusted.

In accordance to the characters of the hysteresis comparator 132 as shown in FIG. 3, the hysteresis comparator 132 generates an output signal with a voltage $U_O$ alternating between $U_Z$ and 0 volt with the voltage $U_I$ of the internal temperature signal changing.

In the embodiment, when the internal temperature of the electronic device 10 exceeds the determined temperature, the voltage $U_I$ of the internal temperature signal falls to below the low voltage threshold. Therefore, the inverting input of the hysteresis comparator 132 receives the internal temperature signal with the voltage $U_I$ below the lower triggering voltage $U_{P2}$ of the hysteresis comparator 132. Accordingly, the hysteresis comparator 132 generates the output signal with the voltage $U_O$ equal to the voltage $U_Z$. In the embodiment, the output signal with the voltage $U_O$ equal to the voltage $U_Z$ is defined as the power-off signal of the thermal protection circuit 130.

When the internal temperature of the electronic device 10 falls to below the restarting temperature, the voltage $U_I$ of the internal temperature signal rises to above the high voltage threshold. Therefore, the inverting input of the hysteresis comparator 132 receives the internal temperature signal with the voltage $U_I$ above the upper triggering voltage $U_{P1}$ of the hysteresis comparator 132. Accordingly, the hysteresis comparator 132 generates the output signal with the voltage $U_O$ equal to 0 volt. In the embodiment, the output signal with the voltage $U_O$ equal to 0 volt is defined as the power-on signal of the thermal protection circuit 130.

The switch circuit 133 is configured with controllable switches, such as bipolar junction transistors (BJTs), metal oxide semiconductor field transistors (MOSFETs), for example. In the embodiment, the switch circuit 133 comprises a p-channel MOSFET Q1. The MOSFET Q1 comprises a source to receive the power signals provided by the power supply 110, a drain to output the power signals to the function circuit 120, and a gate to receive the power-on signal or the power-off signal output by the thermal protection circuit 130. In response to the power-on signal and the power-off signal, the switch circuit 133 transmits or stops transmitting the power signals to the function circuit 120, respectively.

In the embodiment, when the internal temperature of the electronic device 10 is below the determined temperature, the temperature sensor 131 outputs the internal temperature signal with the voltage $U_I$ not lower than the lower triggering voltage $U_{P2}$. Therefore, the hysteresis comparator 132 generates the output signal with 0 volt as the power-on signal. The gate of the MOSFET Q1 receives the power-on signal, and the MOSFET Q1 turns on. Therefore, the switch circuit 133 transmits the power signals to the function circuit 120.

When the internal temperature of the electronic device 10 exceeds the determined temperature, the temperature sensor 131 outputs the internal temperature signal with the voltage $U_I$ lower than the lower triggering voltage $U_{P2}$. Therefore, the hysteresis comparator 132 generates the output signal with the voltage $U_Z$ as the power-off signal. The gate of the MOSFET Q1 receives the power-off signal, and the MOSFET Q1 turns off. Therefore, the switch circuit 133 stops transmitting the power signals to the function circuit 120. Thus, the function circuit 120 is power off and the electronic device 10 cools down. Obviously, the electronic device 10 avoids irreversibly damages because of timely thermal protection.

As the electronic device 10 cools down, the internal temperature falls and the voltage $U_I$ of the internal temperature signal rises proportionally. When the internal temperature of the electronic device 10 falls to below the restarting temperature, the voltage $U_I$ of the internal temperature signal rises to above the upper triggering voltage $U_{P1}$. Therefore, the hysteresis comparator 132 outputs the output signal with the voltage $U_Z$ as the power-on signal. The gate of the MOSFET Q1 receives the power-on signal, and the MOSFET Q1 turns on. Therefore, the switch circuit 133 transmits the power signals to the function circuit 120. Thus, the electronic device 10 is restarted.

It is apparent that embodiments of the present disclosure provide an electronic device with a thermal protection circuit operable to be turned off before over-heat and to be turned on after cooling down automatically. Therefore, the electronic device is protected from over-heat.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A thermal protection circuit for an electronic device, comprising:
   a temperature sensor operable to sense an internal temperature of the electronic device and output an internal temperature signal with a voltage, wherein the voltage of the internal temperature signal is inversely proportional to the internal temperature;
   a hysteresis comparator to output a power-off signal when the voltage of the internal temperature signal is lower than a low voltage threshold representing a determined temperature, or output a power-on signal when the voltage of the internal temperature signal is higher than a high voltage threshold representing a restarting temperature of the electronic device;
a switch circuit to stop transmitting power signals to the electronic device in response to the power-off signal, or continue to transmit the power signals to the electronic device in response to the power-on signal;
wherein the hysteresis comparator comprises:
a zener diode with an anode grounded, wherein a voltage of the zener diode is greater than a voltage of the power signals;
a second voltage division circuit connected between a second reference voltage and a cathode of the zener diode, the second voltage division circuit comprising a second resistor and a third resistor connected in series;
an operational amplifier comprising an inverting input to receive the internal temperature signal, a non-inverting input connected to a common node of the second resistor and the third resistor of the second voltage division circuit, and an output connected to the cathode of the zener diode and outputting the power-on signal and the power-off signal;
wherein an upper triggering voltage and a lower triggering voltage of the hysteresis comparator are respectively defined as the high voltage threshold and the low voltage threshold; and
wherein the upper triggering voltage is calculated by $U_{P1}=U_2 \times R2/(R2+R3)+UZ \times R3/(R2+R3)$, where $U_{P1}$ represents the voltage of the upper triggering voltage, $U_2$ represents a voltage of the second reference voltage, $U_Z$ represents the voltage of the zener diode voltage, R2 and R3 represent resistances of the second resistor and the third resistor, respectively.

2. The thermal protection circuit as claimed in claim 1, wherein the temperature sensor comprises a first voltage division circuit connected between a first reference voltage and ground, the first voltage division circuit comprises a first resistor and a thermistor connected in series, where a common node of the first resistor and the thermistor is defined as an output of the temperature sensor to output the internal temperature signal.

3. The thermal protection circuit as claimed in claim 2, wherein the thermistor has a negative temperature coefficient, the first resistor and the thermistor are connected in turn between the first reference voltage and the ground.

4. The thermal protection circuit as claimed in claim 2, wherein the thermistor has a positive temperature coefficient, the thermistor and the first resistor are connected in turn between the first reference voltage and the ground.

5. The thermal protection circuit as claimed in claim 1, wherein the hysteresis comparator further comprising a fourth resistor to limit current flowing through the output of the operational amplifier.

6. The thermal protection circuit as claimed in claim 1, wherein the switch circuit comprises a metal oxide semiconductor field transistor with a source to receive the power signals, a drain to transmit the power signals to the electronic device, and a gate to receive the power-on signal and the power-off signal.

7. The thermal protection circuit as claimed in claim 6, wherein the metal oxide semiconductor field transistor is P-channel type.

8. An electronic device, comprising:
a function circuit;
a power supply to provide power signals to drive the function circuit; and
an thermal protection circuit deposed between the power supply and the function circuit, comprising:
a temperature sensor to sense an internal temperature of the electronic device and output an internal temperature signal with a certain voltage, wherein the voltage of the internal temperature signal is inversely proportional to the internal temperature;
a hysteresis comparator to output a power-off signal when the voltage of the internal temperature signal is lower than a low voltage threshold representing a determined temperature, or output a power-on signal when the voltage of the internal temperature signal is higher than a high voltage threshold representing a restarting temperature of the electronic device;
a switch circuit to stop transmitting power signals to the function circuit in response to the power-off signal, or continue to transmit the power signals to the function circuit in response to the power-on signal;
wherein the hysteresis comparator comprises:
a zener diode with an anode grounded, wherein a voltage of the zener diode is greater than a voltage of the power signals;
a second voltage division circuit connected between a second reference voltage and a cathode of the zener diode, the second voltage division circuit comprising a second resistor and a third resistor connected in series;
an operational amplifier comprising an inverting input to receive the internal temperature signal, a non-inverting input connected to a common node of the second resistor and the third resistor of the second voltage division circuit, and an output connected to the cathode of the zener diode and outputting the power-on signal and the power-off signal;
wherein an upper triggering voltage and a lower triggering voltage of the hysteresis comparator are respectively defined as the high voltage threshold and the low voltage threshold; and
wherein the upper triggering voltage is calculated by $U_{P1}=U_2 \times R2/(R2+R3)+UZ \times R3/(R2+R3)$, where $U_{P1}$ represents the voltage of the upper triggering voltage, $U_2$ represents a voltage of the second reference voltage, $U_Z$ represents the voltage of the zener diode voltage, R2 and R3 represent resistances of the second resistor and the third resistor, respectively.

9. The electronic device as claimed in claim 8, wherein the temperature sensor comprises a first voltage division circuit connected between a first reference voltage and the ground, the first voltage division circuit comprises a first resistor and a thermistor connected in series and a common node of the first resistor and the thermistor is defined as an output of the temperature sensor to output the internal temperature signal.

10. The electronic device as claimed in claim 9, wherein the thermistor has a negative temperature coefficient, the first resistor and the thermistor are connected in turn between the first reference voltage and the ground.

11. The electronic device as claimed in claim 9, wherein the thermistor has a positive temperature coefficient, the thermistor and the first resistor are connected in turn between the first reference voltage and the ground.

12. The electronic device circuit as claimed in claim 8, wherein the hysteresis comparator further comprising a fourth resistor to limit current flowing through the output of the operational amplifier.

13. The electronic device as claimed in claim 8, wherein the switch circuit comprises a metal oxide semiconductor field transistor, the metal oxide semiconductor field transistor comprises a source to receive the power signals provided by the power signals, and a drain to transmit the power signals to the function circuit, and a gate to receive the power-on signal and the power-off signal.

14. The electronic device as claimed in claim 13, wherein the metal oxide semiconductor field transistor is a p-channel metal oxide semiconductor field transistor.

* * * * *